United States Patent [19]

Lagerwall et al.

[11] Patent Number: 4,838,663
[45] Date of Patent: Jun. 13, 1989

[54] DEVICE FOR SUBMICROSECOND ELECTRO-OPTIC MODULATION IN THE LIQUID CRYSTAL SMECTIC-A PHASE USING ORTHOGONAL BOOKSHELF GEOMETRY

[75] Inventors: Sven T. Lagerwall; Gunnar Andersson, both of Gothenburg; Ingolf Dahl, Mölndal; Wojciech Kuczynski, Gothenburg; Kent Skarp, Lindome; Bengt Stebler, Gothenburg, all of Sweden

[73] Assignee: S.A.R.L. S.T. Lagerwall, Bandol, France

[21] Appl. No.: 105,254

[22] Filed: Oct. 7, 1987

[30] Foreign Application Priority Data

Oct. 7, 1986 [EP] European Pat. Off. ........ 86850337.6

[51] Int. Cl.$^4$ .............................................. G02F 1/13
[52] U.S. Cl. .................. 350/350 S; 350/341; 350/347 E
[58] Field of Search .................. 350/341, 350 S, 347 E

[56] References Cited

U.S. PATENT DOCUMENTS

4,634,226  1/1987  Isogai et al. ............... 350/350 S X

FOREIGN PATENT DOCUMENTS

61-153623  7/1986  Japan ............................... 350/350 S

Primary Examiner—Stanley D. Miller
Assistant Examiner—Richard F. Gallivan
Attorney, Agent, or Firm—Young & Thompson

[57] ABSTRACT

A new liquid crystal electro-optic device similar to the SSFLC device is described. It uses the same kind of polar chiral smectics and the same geometry as the SSFLC device (thin sample in the "book-shelf" layer arrangement) but instead of using a tilted smectic phase like the C* phase, it utilizes the above-lying, essentially non-ferroelectric A phase. The achievable optical intensity modulation is considerably lower than for the SSFLC device, but the device is about one hundred times faster. It is thus appropriate for modulator rather than for display applications. Sample fabrication is simpler and, finally, the device is insensitive to polarization compensation from external charges. The electro-optic switching at moderate applied voltages can be detected through the full range of the A phase.

6 Claims, 4 Drawing Sheets

DOBA-1-MPC

DEVICE FOR SUBMICROSECOND ELECTRO-OPTIC MODULATION IN THE LIQUID CRYSTAL SMECTIC-A PHASE USING ORTHOGONAL BOOKSHELF GEOMETRY

BACKGROUND AND DESCRIPTION OF PRIOR ART

Ferroelectric smectics have recently entered the domain of liquid crystal applications, in the so-called SSFLC (Surface stabilized ferroelectric liquid crystal) device, as disclosed in U.S. Pat. No. 4,367,924 and characterized, among other things, by a very high switching speed. The device utilizes the chiral smectic C phase or any chiral tilted smectic phase which all have the characteristic of being ferroelectric, i.e. exhibiting a spontaneous macroscopic electric polarization, at least on a local scale.

Due to the presence of a spontaneous polarization, ferroelectric smectics are very sensitive to an external electric field. In the SSFLC device one utilizes the switchability of the permanent polarization vector between two equivalent stable states, differing in the polarization direction ("up" or "down") corresponding to two different directions of tilt, $+\theta$ and $-\theta$, where $\theta$ is the angle between the smectic layer normal and the average direction of the long axes of the molecules. In the device proposed here, we utilize instead a non-tilted and therefore non-ferroelectric smectic phase adjacent to a tilted smectic phase of a chiral material, e.g. the A phase lying directly above the C phase. Due to the electro-clinic effect, first described by S. Garoff and R. B. Meyer in Physical Review Letters, volume 38, page 848, from 1977, there is a response of the optic axis to an applied external electric field. With the smectic layers parallel to the confining glass plates, which has been the experimental condition studied so far, the effect is small and requires phase-sensitive methods for its detection. In very thin samples, 1 to 3 $\mu$m, and with the smectic layers perpendicular instead of parallel to the glass plates (this is the so-called book-shelf geometry typical of the SSFLC cells) the effect is however easily and strikingly detectable at conveniently low applied fields, even in the CMOS-compatible and thus technically accessible range of 10 to 30 volts.

The electro-optic device of the present invention is faster than any liquid crystal device known so far. For the same material ad applied field strength the response is typically one hundred times faster than that of SSFLC devices. Furthermore sample preparation is much easier, due to the wellknown alignment methods that can be used, for instance in the case of the A phase. Because of the absence of ferroelectricity in non-tilted phases the problem of charge-collecting from outside does never arise for the present device.

The bookshelf geometry can be obtained by shearing the glass plates or by other methods, e.g. slow cooling in a magnetic field of about 2 Tesla. The preferred geometry is, however, particularly easily obtained for substances having a nematic phase on top of the smectic A phase. In this case oblique evaporation of SiO, or coating with PVA, polyimide or silane followed by rubbing the surface in a buffing machine, will align the nematic and succeedingly the smectic phase, as is well known by those skilled in the art.

DESCRIPTION OF DEVICE PRINCIPLE AND EMBODIMENTS

Figure 1:
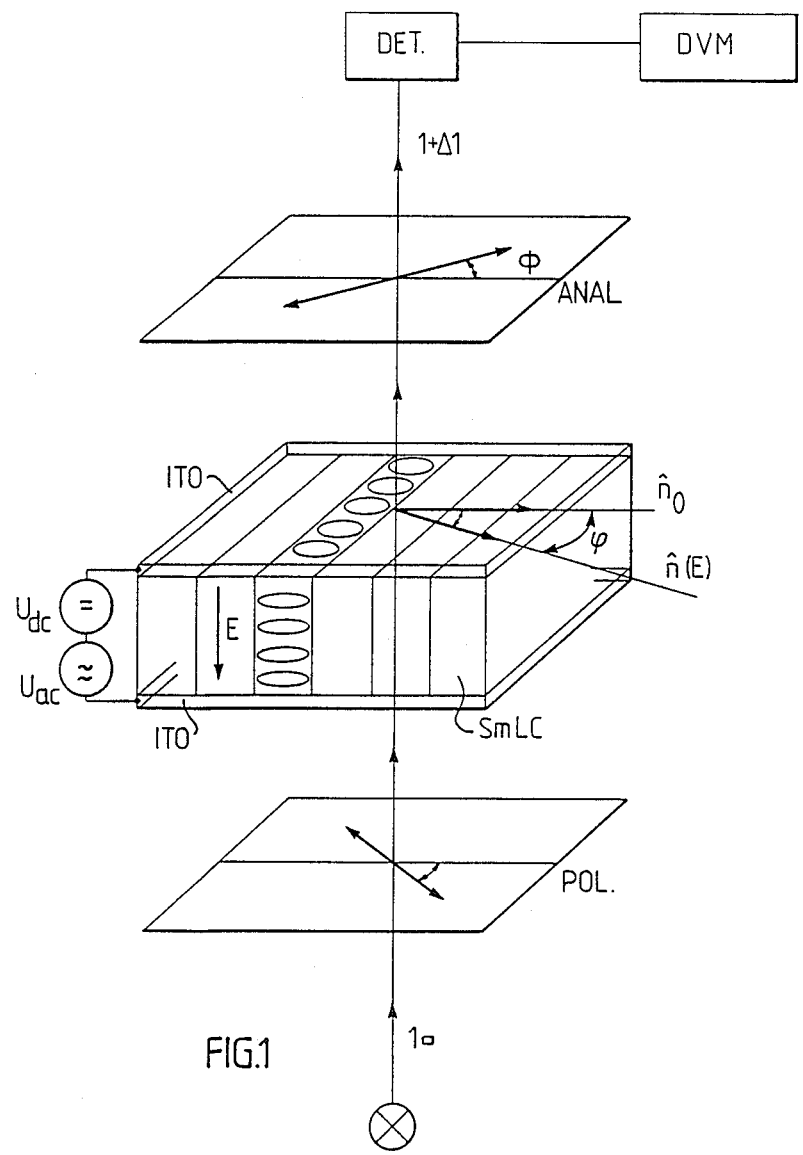
FIG. 1 is a view of the smectic liquid crystal layers in the bookshelf configuration, i.e. homogenously aligned with the layers perpendicular to the confining glass plates and with polarizers, conductive electrodes and voltage source shown, as well as the non-tilted ($\hat{n}_o$) and tilted ($\hat{n}$) direction of the optic axis, FIG. 2 defines the angle $\phi$ between the optic axis and the polarizer direction.
Figure 2:
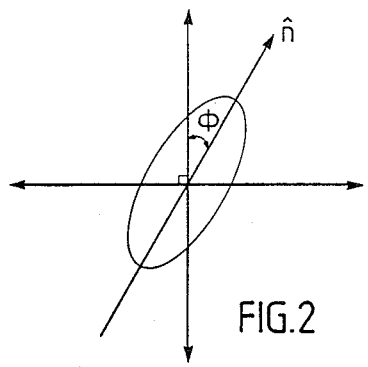

The principle and operation of the device will now be described with reference to the drawings. If we apply an electric field E across the chiral smectic above the C—A transition, as shown in FIG. 1 where the bookshelf geometry is also illustrated, the director $n_o$ will swing out to the oblique direction n(E), due to the electroclinic effect. The directions in the figure correspond to the case of $P>0$ (ferroelectric positive substance). We may look upon the A phase as a retardation plate with a field-sensitive optic axis. Between crossed polarizers the intensity varies as $$I \sim \sin^2 2\phi$$

where $\phi$ is the deviation of the optical axis from one of the polarizer directions (FIG. 2). $\phi$ is a function of the applied electric field, because of the electroclinic effect. Hence the intensity modulation $\Delta I$, being the differential of I, will vary as $$\Delta I = \frac{dI}{d\phi} \cdot \frac{d\phi}{dE} \cdot \Delta E \sim \sin 4\phi \ \{d\phi/dE\} \cdot \Delta E \qquad (1)$$

The characteristic feature of the electroclinic effect is a linear dependence of the change in the optic axis direction $\phi$ on the electric field E. Thus, from equation (1), the light intensity will also vary in a linear fashion. This property is used in the present device for light intensity modulation.

As an illustrative example, the electro-optic behaviour, according to the present invention, is presented for the substance DOBA-1-MPC (P-decyloxybenzylidene-p'-amino-1-methylpropylcinnamate), which exhibits the phase sequence below (X crystal, S smectic, L liquid)

$$X 28 \, °S_3 \, 65 \, °C.* \, 83 \, °A \, 102,5 \, °L$$

Figure 3:
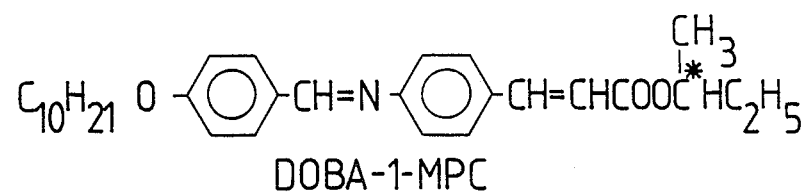
FIG. 3 shows the structure of the molecule DOBA-1-MPC.

The molecular formula of this substance is shown in FIG. 3. The properties of the substance are fairly standard with large but not extremely large polarization values, being 20 nC cm$^{-2}$. (Substances with more than 10 times these values are available.) It should be pointed out that all ferroelectric substances investigated so far easily display the electro-optic response described below, and that, generally, the effects persist and are easily measurable in the whole smectic range up to the nematic or isotropic transition.

Figure 4:
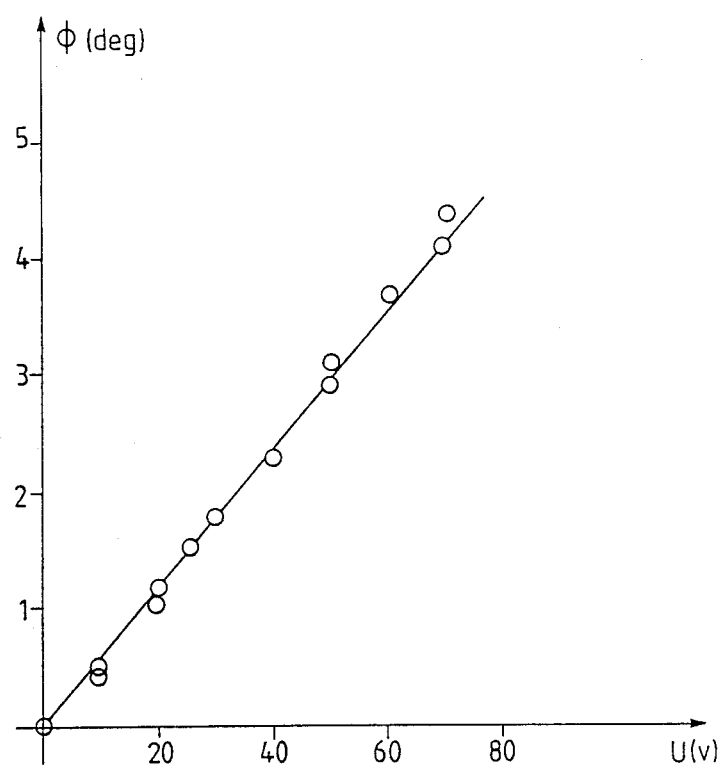
FIG. 4 shows the field dependence of the induced tilt in this material.

The smectic material was introduced, in the higher-lying isotropic or nematic phase, between two ITO-coated glass plates and then taken down to the smectic A phase where it is used. The smectic A phase was oriented to the bookshelf geometry using the shearing method. The cell was then placed between polarizers with the liquid crystal optic axis at 22.5 degrees to the polarizer directions, After applying a DC or AC voltage to the ITO electrodes, a change of optic axis direction is observed. This change causes a corresponding change of transmitted light intensity, which is registered e.g. by a photodiode. The response in tilt angle (measured by rotating the sample to extinction for every field strength applied) is shown in FIG. 4. From the figure it is clear that the induced tilt angle is really a linear function of the applied voltage, even at rather high values of the tilt.

Figure 5:
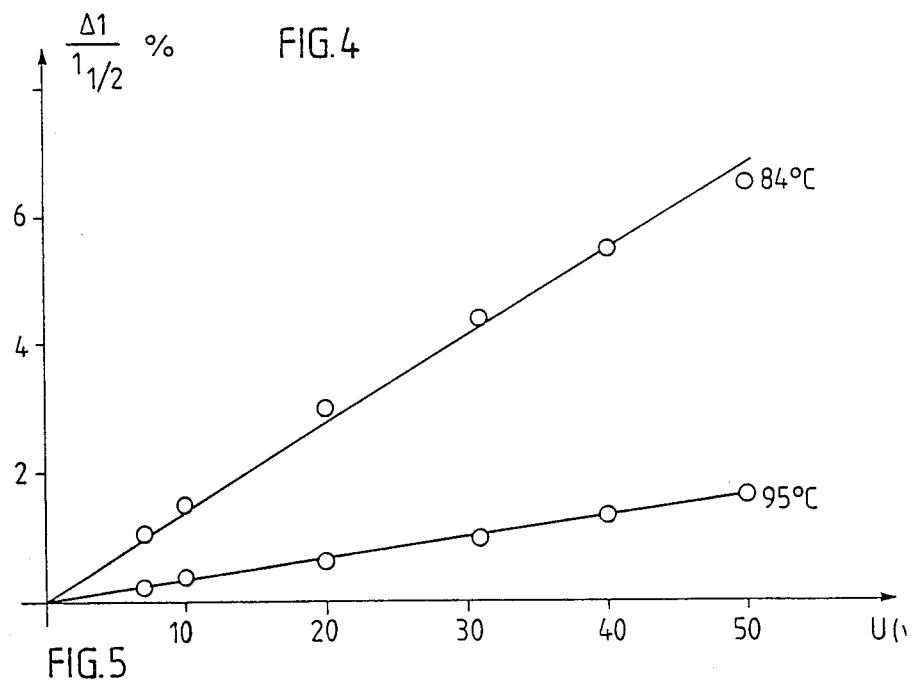
FIG. 5 shows the modulation depth as a function of applied voltage at two temperatures.

In FIG. 5 is shown the dependence of the depth of optical modulation (in percent of maximum transmittance) on the applied voltage for two different temperatures (84° C. and 95° C.).

Figure 6:
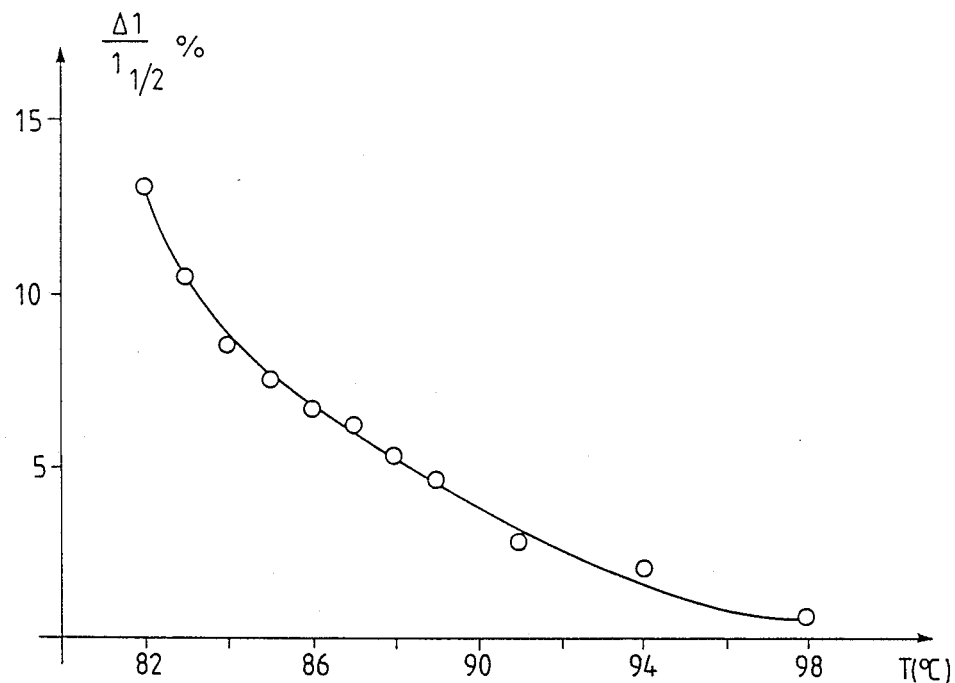
FIG. 6 shows the modulation amplitude as a function of temperature at constant voltage.

Finally, FIG. 6 shows the amplitude of intensity modulation as a function of temperature, at a constant applied field of 50 volts over a 2 m thick sample. As can be seen the electrooptic switching can be observed in the whole smectic A range. The absolute value of the electric field induced tilt angle is about 3-4 corresponding to the attainable modulation ratio of 10-15% in this substance, with the described polarizer setting. Some other substances also studied at present show much larger induced tilt angles, and thus larger optical modulation.

The electro-optic characteristics can be used in several modes. With a polarizer setting symmetrical with regard to both tilt states which are two different optical extremum states corresponding to field off and maximum applied field, the effect being insensitive to the direction (+ or −) of the electric field and giving an optical modulation frequency of 2ω if a field of frequency ω is applied. With unsymmetrical polarizer setting the plus and minus field states correspond to different optical states; thus three device states, including the zero state, are attainable for every value of the voltage amplitude.

With the crossed-polarizer setting $\phi = 22.5°$ the response is linear and the absolute value of intensity variation ($\Delta I$) is maximized. If instead it is desirable to have a modulation around a high-extinction state and a higher modulation depth, a polarizer setting corresponding to $\phi = \phi$ should be used. At the cost of lower luminosity, any modulation depth $$\frac{\Delta I}{I} \sim \frac{\sin 4\phi}{\sin^2 2\phi} \sim \tan^{-1} 2\phi \quad (2)$$

could then be achieved.

An especially efficient way of operating the modulator, for any polarizer mode, would be to combine a monochromatic light source with a retarder plate, e.g. using a mercury lamp together with a λ-plate.

Figure 7:
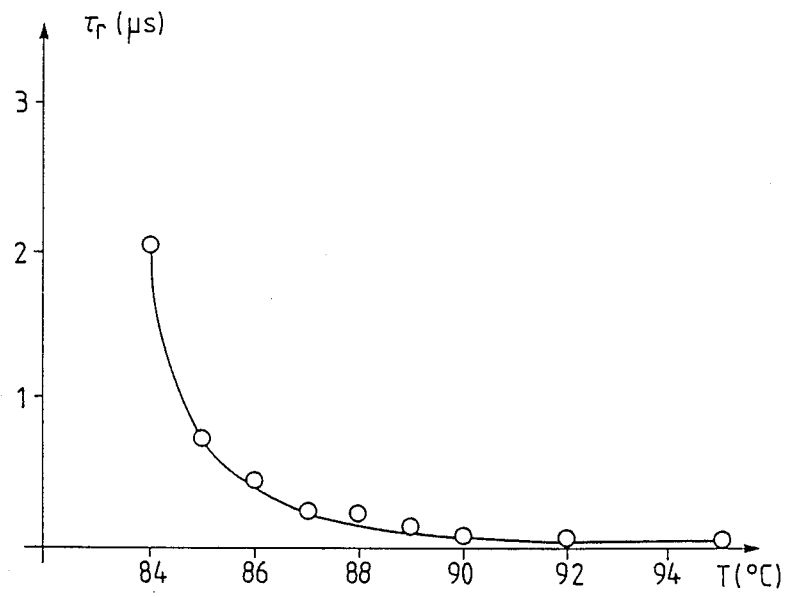
FIG. 7 shows the device rise time (10%–90%) as a function of temperature.

Of special importance in the present device is the rise time. This time, defined in the usual way as the time between the 10% and 90% response level, was measured using a PIN-photodiode and a squarewave generator. The observed rise times were in the range of 150 ns or less as can be seen from FIG. 7. Actually, the 150 ns was a limit set by our present detection equipment, and we could in some cases infer a much more rapid response. Furthermore, in this electrooptic effect there is no delay time prior to the 10% level, characteristic of most other liquid crystal effects.

Generally the rise times were at least one hundred times shorter than those of analogous SSFLC device working in the smectic C* phase of the same material.

We claim:

1. A light modulating device comprising two polarizing layers, two transparent confinement plates provided with electrodes, and a chiral smectic liquid crystal confined between the plates in a bookshelf geometry, said liquid crystal in a field-free state having its molecules orthogonal to its smectic layers, a voltage applied across said electrodes resulting in a tilting of the molecules of the liquid crystal and an ensuing change of its polarizing properties and in the transmission of a light ray passing through the device.

2. The device of claim 1 wherein the liquid crystal is in the smectic A phase.

3. The device of claim 1 in which the liquid crystal is in an orthogonal smectic phase being thermally adjacent to a tilted smectic phase, the said tilting corresponding to either a lower or higher temperature phase.

4. The device of claim 1 wherein the properties of the liquid crystal are such that no tilted phase results solely from a change of temperature.

5. The device of claim 1 wherein the liquid crystal is doped with a dichroic dye which dye constitutes one of the polarizing layers.

6. The device of claim 1 wherein one of said polarizing layers comprising a retarder plate, eventually in combination with a reflector.

* * * * *